G. RIEKE.
Thrashing Machine.
No. 113,345.
3 Sheets—Sheet 2.
Patented April 4, 1871.
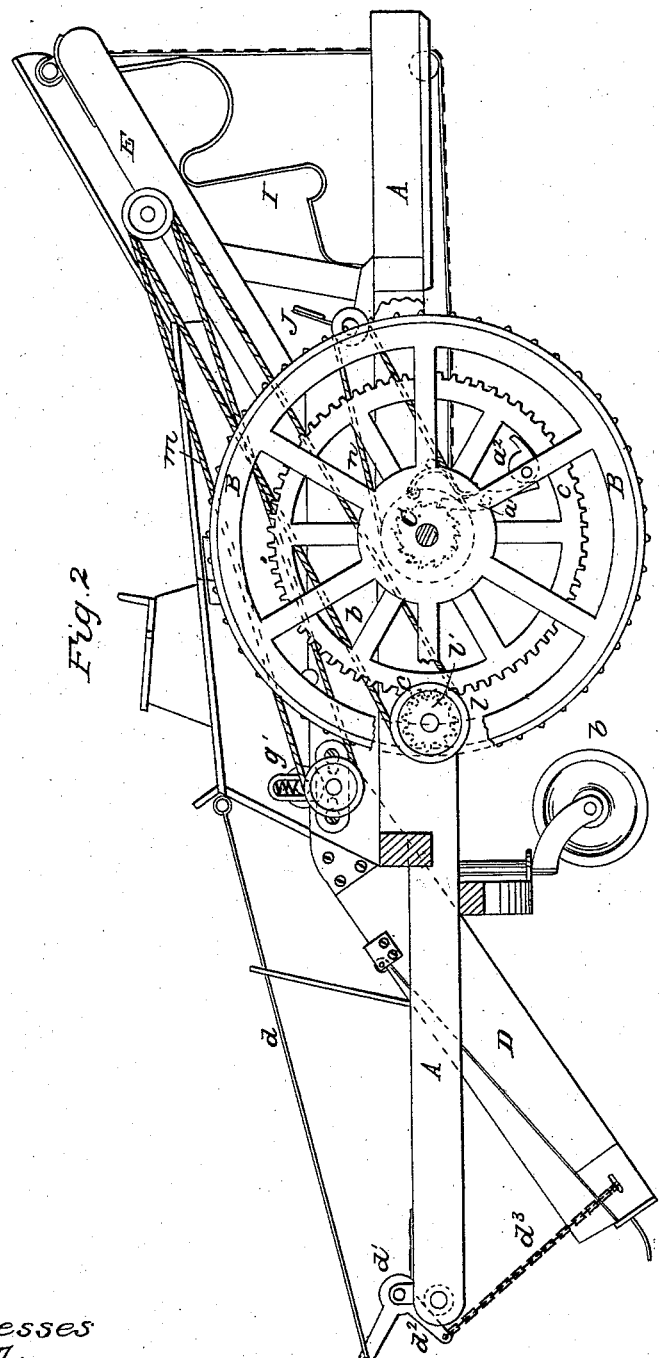

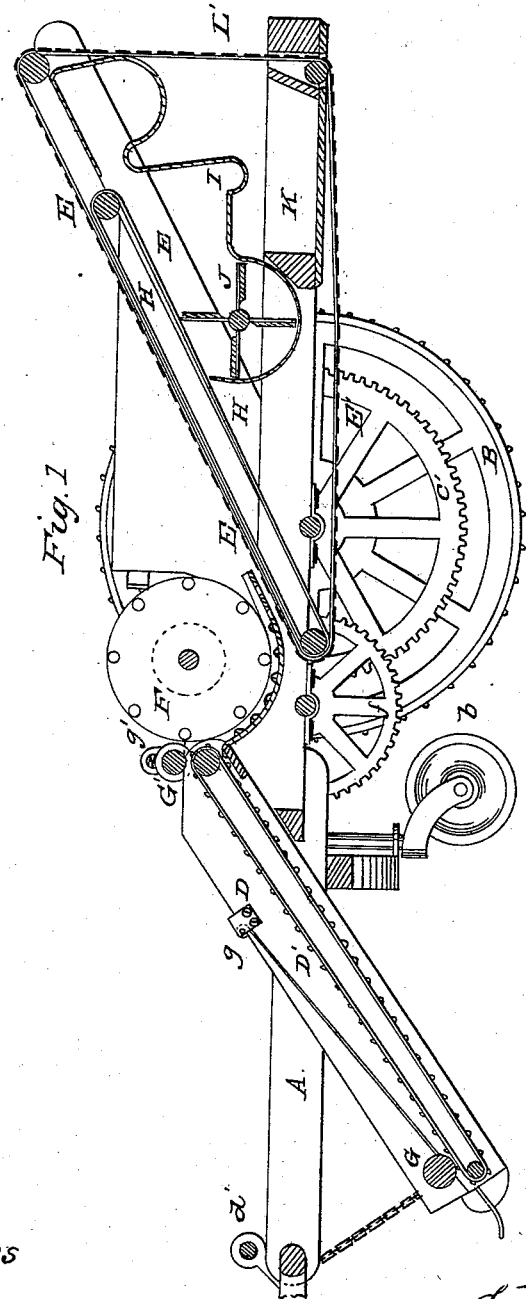

G. RIEKE.
Thrashing Machine.
No. 113,345.
3 Sheets—Sheet 3.
Patented April 4, 1871.
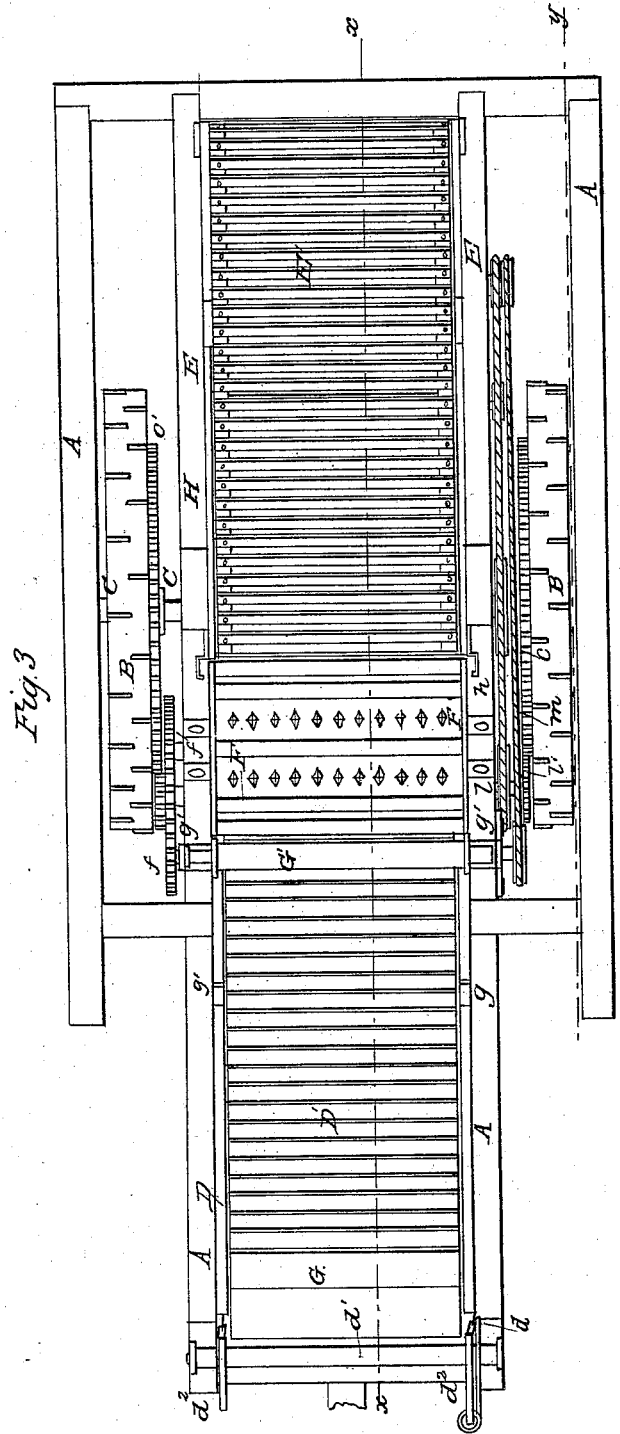

United States Patent Office.

GEORGE RIEKE, OF KAIRO TOWNSHIP, MINNESOTA.

Letters Patent No. 113,345, dated April 4, 1871.

IMPROVEMENT IN FIELD THRASHING-MACHINES.

The Schedule referred to in these Letters Patent and making part of the same.

*To all whom it may concern:*

Be it known that I, GEORGE RIEKE, of Kairo township, in the county of Renville and State of Minnesota, have invented an Improved Thrashing-Machine; and I do hereby declare the following to be a full, clear, and exact description of the same, reference being had to the accompanying drawing forming part of this specification, in which—

Figure 1 is a longitudinal vertical section in line $x$ $x$ of fig. 2;

Figure 2 is a side elevation showing a section of the wheel in line $y$ $y$ of fig. 3; and Figure 3 is a plan or top view of the machine.

Similar letters of reference in the accompanying drawing denote corresponding parts.

This invention relates to that class of thrashing-machines which is designed to follow the harvester in the field, gathering up, thrashing, cleaning and bagging the grain; and the invention consists in the construction of the several parts as hereinafter set forth, whereby they are better adapted to perform their functions than heretofore.

In the drawing—

A is the frame of the machine, supported upon a caster, $b$, and two large wheels B B, running loosely on an axle, C, to which are fixed two large gear-wheels $c$ $c'$, one on each side of the machine.

The draught-wheels B B may be caused to rotate with their axle by means of a friction clutch or ratchet-and-spring pawl, $a$ $a^1$, provided with an eccentric lever, stop, or key, $a^2$, for fastening the pawl or clutch out of contact with the ratchet, or allowing it to engage therewith, as may be desired.

The main horizontal frame of the machine supports two auxiliary inclined frames D E, the former hinged at its rear end, and vertically adjustable at its front by means of a rod, $d$, rock-shaft, $d^1$, lever, $d^2$, and chain, $d^3$, its object being to support an endless-apron carrier, D', by which the cut grain is conveyed from the ground to the thrashing-drum F.

G is a roller at the lower end of the apron, bearing in hinged pieces $g$ $g$, which permit it to adjust itself to the quantity of straw passing under it at any time, the function of the roller being to press down the straw and keep it in contact with the apron so that the action of the latter shall be constant and uniform, and the straw be kept within the bulk necessary in feeding properly to the thrashing-machine drum.

At the upper end of the apron is the second roller G', for a similar purpose, said roller bearing in slots $g'$ $g'$, which enable it to rise over the straw when the latter wedges under it in large quantities.

The grain thus packed and fed properly to the drum is thrashed by the latter, and the straw is carried away and discharged at the tail of the machine by the second slat-apron E'; the grain falling through the slats of this apron upon a canvas apron, H, working inside of the slat-apron, is carried back and dropped upon an incline, I, being separated from the chaff, &c.

While falling, by the action of a fan, J, the incline discharges it into a receptacle, K, or into bags, as may be preferred.

The drum F is operated by means of a gear, $f$ $f$, upon the right side of the machine; the apron H by a belt, $h$, connecting with a pulley and shaft $l$, operated by a gear, $l'$ $c$; the apron D' by a belt, $m$, connecting with a pulley on one of the rollers of the apron H; the apron E by the same roller, pulleys, and belts as the apron H; and the fan J by a belt, $n$, from a pulley on the main axle.

The construction of the whole machine is simple and its operation effective.

Having thus described my invention,

What I claim as new therein, and desire to secure by Letters Patent, is—

1. In combination with the frame D, adjusting devices $d$ $d^1$ $d^2$ $d^3$, and inclined gathering-apron D', the adjustable roller G G', arranged to operate in the manner and for the purpose substantially described.

2. The field thrashing-machine, herein described, consisting of the frames A D E, drum F, aprons D' E' H, rollers G G', fan J, incline I, wheels B B $b$ $c$ $c'$, pawl and ratchet $a$ $a^1$, eccentric-lever $a^2$, and adjusting devices $d$ $d^1$ $d^2$ $d^3$, said parts being constructed and arranged for operation, substantially as described and set forth.

To the above specification of my improvement I have set my hand this 6th day of March, 1871.

GEORGE RIEKE.

Witnesses:
JOHN TRINE,
LOUIS PABST.